(12) United States Patent
Tomioka et al.

(10) Patent No.: US 12,146,737 B2
(45) Date of Patent: Nov. 19, 2024

(54) BRIDGE DISPLACEMENT CALCULATING APPARATUS, BRIDGE DISPLACEMENT MEASURING APPARATUS, BRIDGE DISPLACEMENT CALCULATING METHOD, BRIDGE DISPLACEMENT MEASURING METHOD, AND NON-TRANSITORY COMPUTER-READABLE RECORDING MEDIUM

(71) Applicant: JAPAN AVIATION ELECTRONICS INDUSTRY, LIMITED, Tokyo (JP)

(72) Inventors: Akihiro Tomioka, Tokyo (JP); Takuya Daigo, Tokyo (JP); Shintaro Ichikawa, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 464 days.

(21) Appl. No.: 17/765,264

(22) PCT Filed: Sep. 2, 2020

(86) PCT No.: PCT/JP2020/033255
§ 371 (c)(1),
(2) Date: Mar. 30, 2022

(87) PCT Pub. No.: WO2021/117301
PCT Pub. Date: Jun. 17, 2021

(65) Prior Publication Data
US 2022/0364842 A1    Nov. 17, 2022

(30) Foreign Application Priority Data

Dec. 13, 2019  (JP) ................................. 2019-225364

(51) Int. Cl.
*G01B 5/30*        (2006.01)

(52) U.S. Cl.
CPC ...................................... *G01B 5/30* (2013.01)

(58) Field of Classification Search
CPC ................................... G01B 5/28; G01B 5/30
(Continued)

(56) References Cited

U.S. PATENT DOCUMENTS 10,127,678 B2 * 11/2018 Pérez ....................... G06T 7/593
10,830,652 B2 * 11/2020 Irie ........................... G01K 3/10
(Continued)

FOREIGN PATENT DOCUMENTS

JP    S52-47207 A     4/1977
JP    2018-204952 A  12/2018

OTHER PUBLICATIONS

Li Liang et al., "Application and Effectiveness of Vibration Measurement System Using Wireless Accelerometer to Aging Bridges," Proceedings of the Japan Concrete Institute vol. 36, No. 2, 2014, pp. 1310-1313 (2.3-3.2), along with an English translation thereof.
(Continued)

*Primary Examiner* — George B Bennett
(74) *Attorney, Agent, or Firm* — Greenblum and Bernstein, P.L.C.

(57) ABSTRACT

A bridge displacement calculating apparatus comprises a DC component removing part, a high-pass filter part, a first integration part, and a second integration part. The DC component removing part outputs DC-removed acceleration data. The high-pass filter part uses, as a cutoff frequency, the reciprocal of a time in which a vehicle has passed between the frame bodies of the bridge. The first integration part integrates input data thereto. The second integration part integrates input data thereto and outputs displacement data. The high-pass filter part receives DC-removed acceleration data, the first integration part receives the output of the high-pass filter part, the second integration part receives the
(Continued)

output of the first integration part, or the first integration part receives the DC-removed acceleration data, the high-pass filter part receives the output of the first integration part, and the second integration part receives the output of the high-pass filter part.

12 Claims, 11 Drawing Sheets

(58) Field of Classification Search
USPC .................................................. 33/521, 533
See application file for complete search history.

(56) References Cited

U.S. PATENT DOCUMENTS

| | | | | |
|---|---|---|---|---|
| 11,120,181 | B1* | 9/2021 | Abedin | .................... G06T 17/20 |
| 11,867,592 | B2* | 1/2024 | Takada | ................. G01M 5/0008 |
| 11,881,102 | B2* | 1/2024 | Kobayashi | ........... G01M 5/0066 |
| 2015/0168208 | A1* | 6/2015 | Sameshima | ............. G01M 7/00 |
| | | | | 73/570 |
| 2018/0283912 | A1* | 10/2018 | Haneda | ............... G01C 19/5776 |
| 2021/0125340 | A1* | 4/2021 | Omori | ........................ G06T 7/20 |
| 2022/0205829 | A1* | 6/2022 | Kiyokawa | ............. G01G 19/035 |
| 2022/0261511 | A1* | 8/2022 | Umekawa | ........... G01M 5/0008 |
| 2023/0105833 | A1* | 4/2023 | Sohn | ........................ G06F 17/17 |
| | | | | 702/42 |
| 2023/0341255 | A1* | 10/2023 | Kobayashi | ........... G01G 19/045 |
| 2023/0341289 | A1* | 10/2023 | Kobayashi | ........... G01M 5/0041 |

OTHER PUBLICATIONS

Notification of Reasons for Refusal (Office Action) issued in Japanese Counterpart Patent Appl. No. 2019-225364, dated Dec. 1, 2020, along with an English translation thereof.

International Search Report issued in International Patent Application No. PCT/JP2020/033255, dated Nov. 24, 2020, along with an English translation thereof.

* cited by examiner

BRIDGE DISPLACEMENT CALCULATING APPARATUS, BRIDGE DISPLACEMENT MEASURING APPARATUS, BRIDGE DISPLACEMENT CALCULATING METHOD, BRIDGE DISPLACEMENT MEASURING METHOD, AND NON-TRANSITORY COMPUTER-READABLE RECORDING MEDIUM

TECHNICAL FIELD

The present invention includes a bridge displacement calculating apparatus and a bridge displacement calculating method for calculating a displacement of a bridge which is induced when a vehicle passes through the bridge, a bridge displacement measuring apparatus and a bridge displacement measuring method for measuring a displacement of a bridge, and a program for causing a computer to execute the bridge displacement calculating method or the bridge displacement measuring method.

BACKGROUND ART

Figure 1:
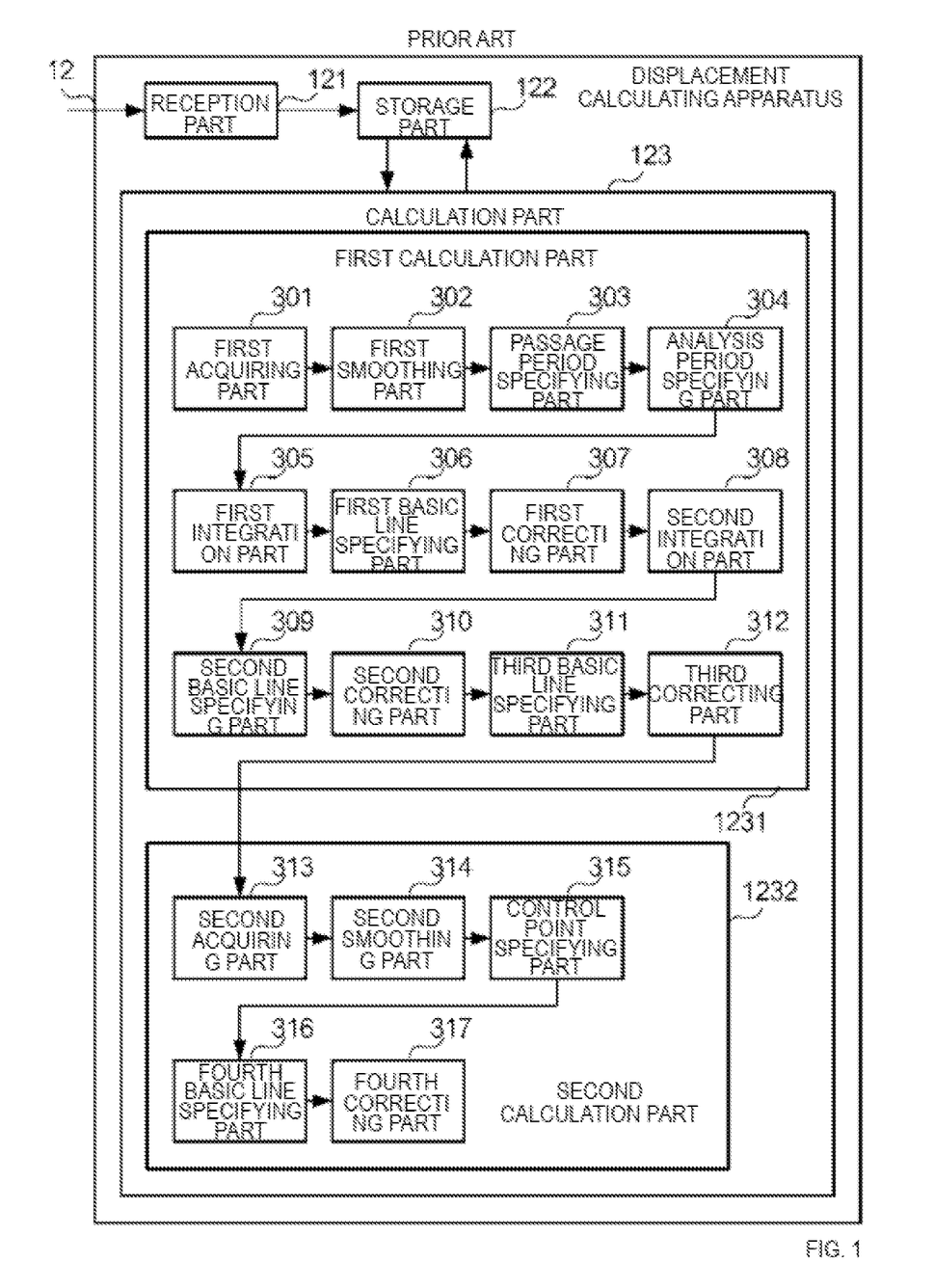
FIG. 1 corresponds to FIG. 3 of Patent literature 1.

Patent literature 1 and the like are known as prior arts for determining a displacement of a bridge by performing second-order integration on an output of an acceleration sensor installed on a bridge. The abstract of Patent literature 1 describes "A reception part 121 of a displacement calculating apparatus 12 continuously receives a measured value of an accelerometer attached to a superstructure of a bridge. A first calculation part 1231 of a calculation part 123 calculates a displacement by performing second-order integration on the measured value of the accelerometer. A gravity component contained in the measured value of the accelerometer and a part of an integration error caused by a measurement error are removed from the displacement calculated by the first calculation part 1231. A second calculation part 1232 of the calculation part 123 specifies a spline curve in which a control point is set to a bottom that appears before and after a timing at which a smoothed displacement obtained by smoothing the displacement calculated by the first calculation part 1231 shows a peak. The second calculation part 1232 subtracts a value indicated by the spline curve from the displacement calculated by the first calculation part 1231 to remove the integration error remaining in the displacement calculated by the first calculation part 1231.". FIG. 1 corresponds to FIG. 3 of Patent literature 1.

PRIOR ART LITERATURE

Patent Literature

Patent literature 1: Japanese Patent Application Laid-Open No. 2018-204952

SUMMARY OF THE INVENTION

Problems to be Solved by the Invention

However, the technique of Patent literature 1 has a problem that it is necessary to specify an analysis period (a first control point and a second control point in Patent literature 1) from acquired data in order to specify the spline curve (See paragraph 0065, etc. of Patent literature 1).

The present invention has an object to determine a displacement of a bridge without specifying any analysis period.

Means to Solve the Problems

A bridge displacement calculating apparatus of the present invention calculates a displacement of a bridge induced when a vehicle passes, based on acceleration data at a predetermined location of the bridge. The bridge displacement calculating apparatus comprises a DC component removing part, a high-pass filter part, a first integration part, and a second integration part. The DC component removing part removes DC components of the acceleration data and outputs DC-removed acceleration data. The high-pass filter part reduces low-frequency components of input data thereto by using, as a cutoff frequency, the reciprocal of a time in which the vehicle has passed between frame bodies of the bridge. The first integration part integrates input data thereto and outputs the integrated input data. The second integration part integrates input data thereto and outputs displacement data. The bridge displacement calculating apparatus performs the following first processing or second processing. In the first processing, the high-pass filter part receives DC-removed acceleration data, the first integration part receives the output of the high-pass filter part, and the second integration part receives the output of the first integration part. In the second processing, the first integration part receives the DC-removed acceleration data, the high-pass filter part receives the output of the first integration part, and the second integration part receives the output of the high-pass filter part. A bridge displacement measuring apparatus of the present invention comprises an acceleration sensor for acquiring acceleration data at a predetermined location of the bridge, a cutoff frequency determining part, and the bridge displacement calculating apparatus of the present invention.

Effects of the Invention

According to the bridge displacement calculating apparatus and the bridge displacement measuring apparatus of the present invention, the low frequency components of the input data are reduced by using, as the cutoff frequency, the reciprocal of the time in which the vehicle has passed between the frame bodies of the bridge, whereby it is possible to reduce measurement errors included in the acceleration data. Therefore, the displacement of the bridge can be determined while avoiding the accumulation of errors caused by integration. Further, in the present invention, it is not necessary to specify an analysis period.

DETAILED DESCRIPTION OF THE EMBODIMENT

Hereinafter, an embodiment of the present invention will be described in detail. The components having the same functions are represented by the same reference numerals, and duplicate description thereof is omitted.

Example 1

Figure 2:
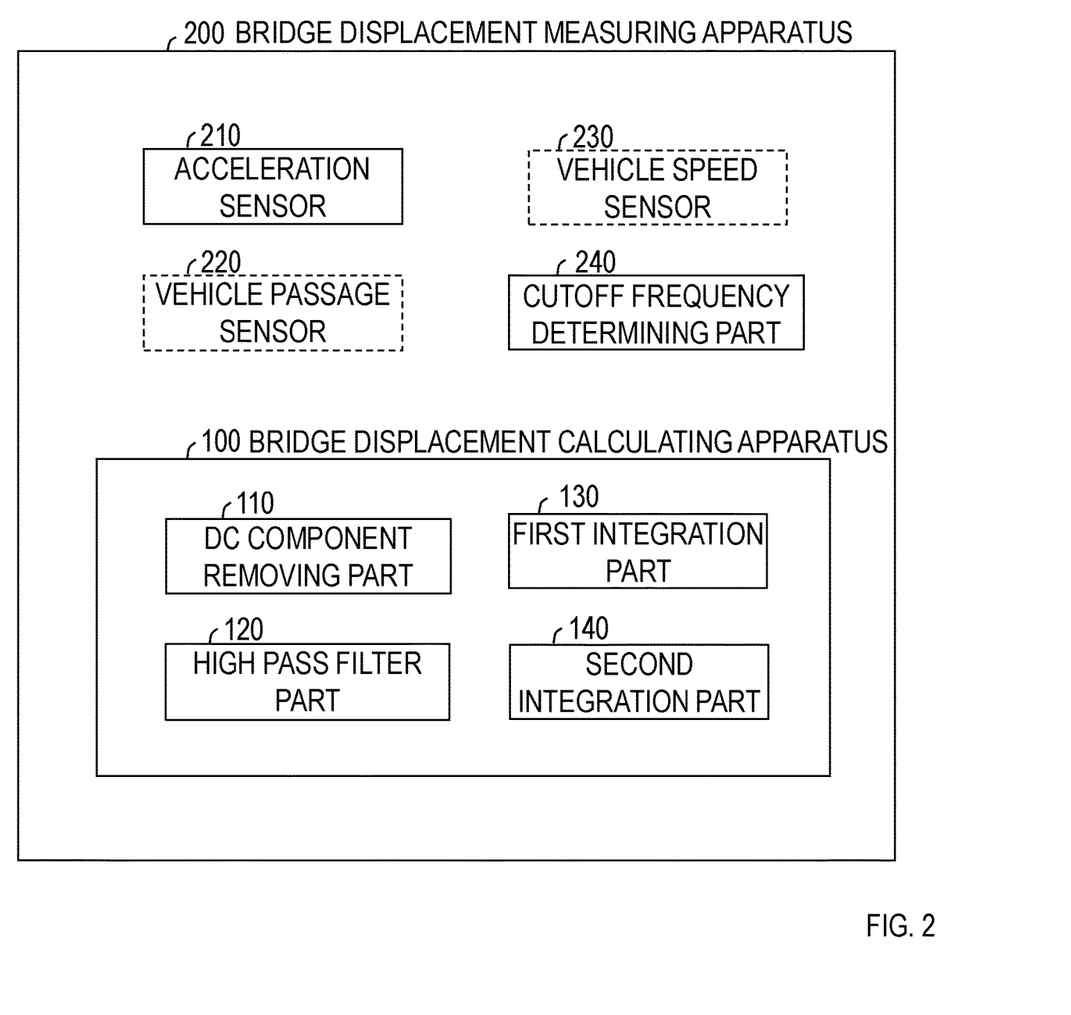
FIG. 2 is a diagram showing functional configuration examples of a bridge displacement calculating apparatus and a bridge displacement measuring apparatus of the present invention.
Figure 3:
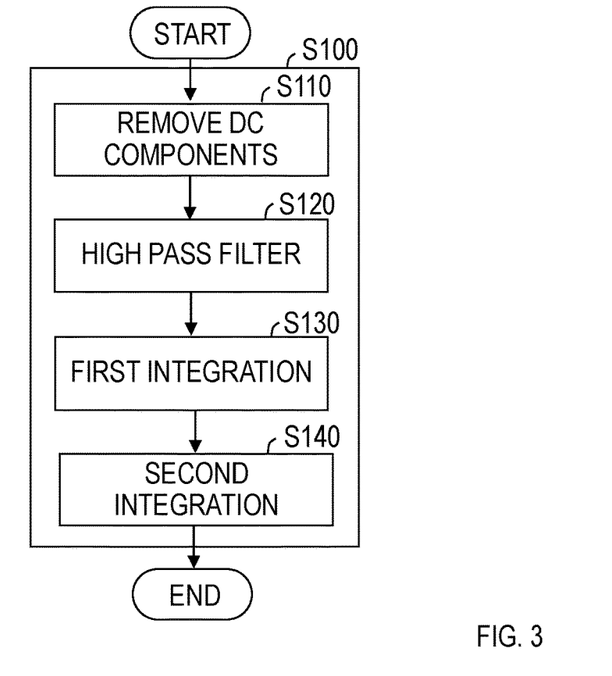
FIG. 3 is a diagram showing a processing flow of a first bridge displacement calculating method of the present invention.
Figure 4:
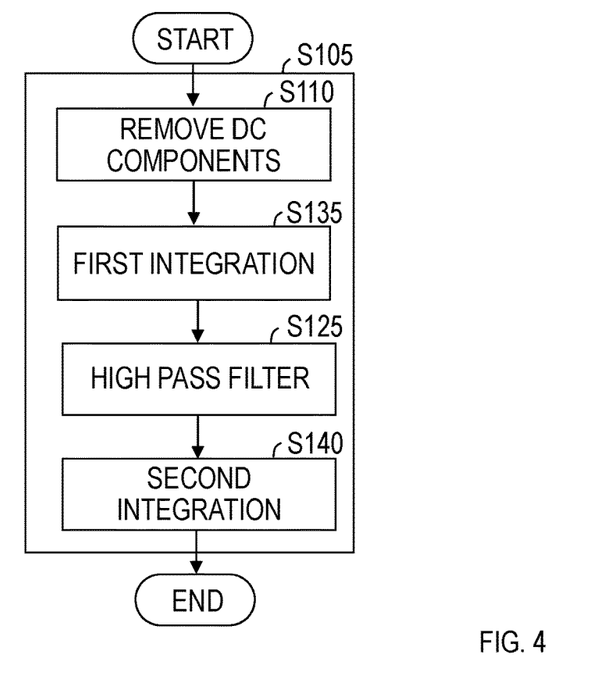
FIG. 4 is a diagram showing a processing flow of a second bridge displacement calculating method of the present invention.
Figure 5:
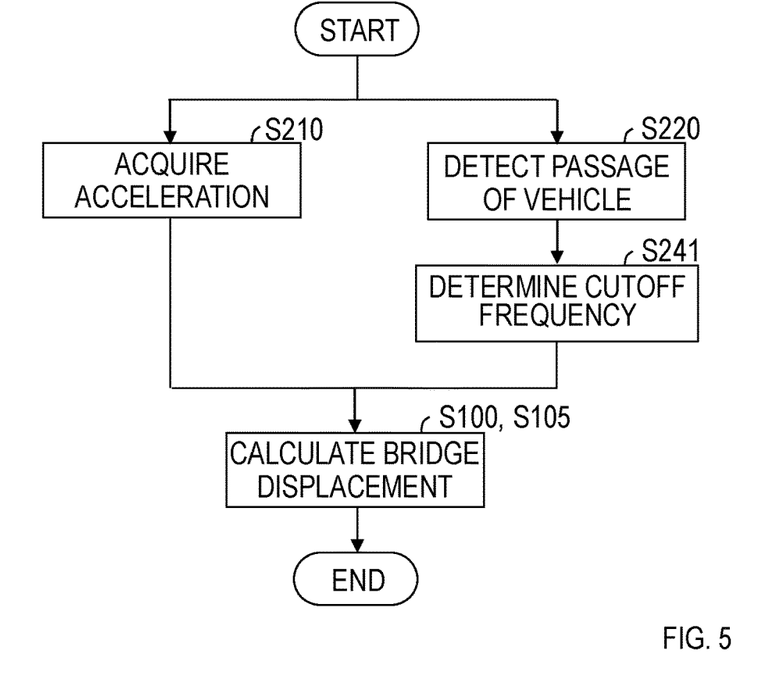
FIG. 5 is a diagram showing a processing flow of a first bridge displacement measuring method of the present invention.
Figure 6:
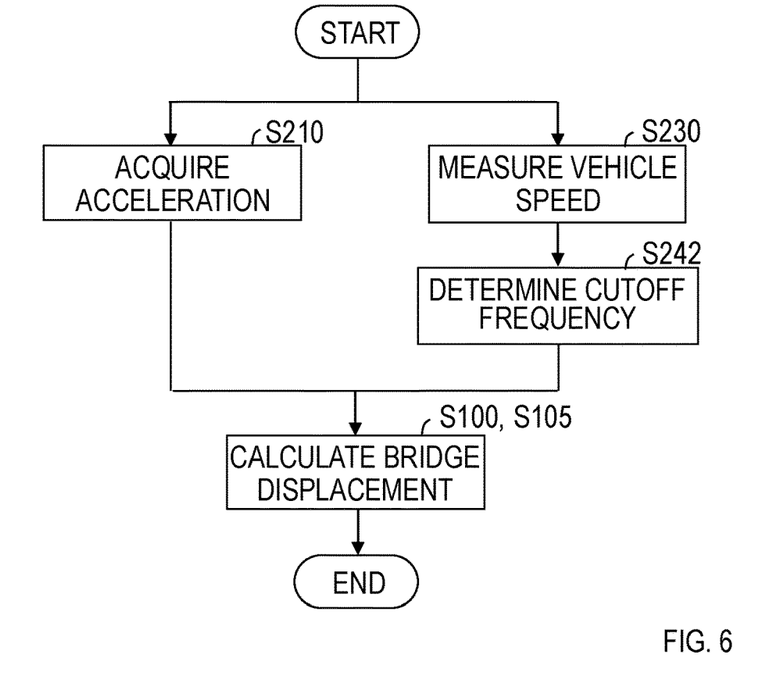
FIG. 6 is a diagram showing a processing flow of a second bridge displacement measuring method of the present invention.

FIG. 2 shows functional configuration examples of a bridge displacement calculating apparatus and a bridge displacement measuring apparatus of the present invention. FIG. 3 shows a processing flow of a first bridge displacement calculating method of the present invention, and FIG. 4 shows a processing flow of a second bridge displacement calculating method of the present invention. FIG. 5 shows a processing flow of a first bridge displacement measuring method of the present invention, and FIG. 6 shows a processing flow of a second bridge displacement measuring method of the present invention.

<Bridge Displacement Calculating Apparatus and Bridge Displacement Calculating Method>

A bridge displacement calculating apparatus 100 calculates a displacement of a bridge that is induced when a vehicle passes through the bridge, based on acceleration data at a predetermined place of the bridge. The bridge displacement calculating apparatus 100 comprises a DC component removing part 110, a high-pass filter part 120, a first integration part 130, and a second integration part 140. The DC component removing part 110 removes a DC component of the acceleration data, and outputs DC-removed acceleration data (S110). The high-pass filter part 120 uses, as a cutoff frequency, the reciprocal of a time in which the vehicle has passed between frame bodies of the bridge, and reduces low frequency components of input data (S120 or S125). The "frame body" means to include both an abutment and a bridge pier. The length related to "between frame bodies" includes a girder length, a span length, etc. However, since the difference between the girder length and the span length does not significantly affect the calculation result of the bridge displacement calculating apparatus 100, either length may be used. Further, "between the frame bodies" may be determined by using other definitions than the definition of the length related to existing bridges. For example, the interval between the frame bodies may be determined based on actually measured values obtained according to a predetermined procedure. The reduction of the low frequency components may include reduction in various characteristics, but it is not required to be strictly specified. The reduction may be performed by about 3 dB in the vicinity of the cutoff frequency.

The first integration part 130 integrates input data, and outputs the integrated input data (S130 or S135). The bridge displacement calculating apparatus 100 performs the following first processing or second processing. In the case of the first processing (see FIG. 3), the high-pass filter part 120 receives DC-removed acceleration data, the first integration part 130 receives an output of the high-pass filter part 120, and the second integration part 140 receives an output of the first integration part 130. In the case of the second processing (see FIG. 4), the first integration part 130 receives the DC-removed acceleration data, the high-pass filter part 120 receives the output of the first integration part 130, and the second integration part 140 receives the output of the high-pass filter part 120.

The second integration part 140 integrates input data, and outputs displacement data (S140). In other words, in the case of the first processing, the second integration part 140 integrates the output of the first integration part 130, and outputs the displacement data. In the case of the second processing, the second integration part 140 integrates the output of the high-pass filter part 120, and outputs the displacement data.

<Bridge Displacement Measuring Apparatus and Bridge Displacement Measuring Method>

A bridge displacement measuring apparatus 200 comprises at least an acceleration sensor 210, a cutoff frequency determining part 240, and a bridge displacement calculating apparatus 100. The acceleration sensor 210 is attached at a predetermined place of the bridge to acquire acceleration data (S210).

The cutoff frequency determining part 240 determines the cutoff frequency (S241 or S242). For example, the bridge displacement measuring apparatus 200 may include a vehicle passage sensor 220 or a vehicle speed sensor 230. The vehicle passage sensor 220 detects a vehicle which is passing each position of two adjacent frame bodies of the bridge (S220). For example, the vehicle passage sensor 220 is a set of two sensors, and the sensors may be arranged on the roads above the respective frame bodies to detect the passage of the vehicle. The cutoff frequency determining part 240 acquires a time in which the vehicle has passed between the frame bodies, based on the time interval between the passage of the vehicle detected by one sensor of the vehicle passage sensor 220 and the passage of the vehicle detected by the other sensor of the vehicle passage sensor 220, and determines the reciprocal of the time as the cutoff frequency (S241). When the vehicle passage sensor 220 is used, it is not necessary to record the data of the interval between the frame bodies. A vehicle speed sensor 230 measures the speed of the vehicle passing through the bridge (S230). The speed of the vehicle passing through the bridge is not necessarily constant, but it may be accurate enough to determine an approximate time in which the vehicle has passed between the frame bodies. In this case, the cutoff frequency determining part 240 records the data of the interval between the frame bodies in advance, and determines the cutoff frequency based on the output of the vehicle speed sensor and the interval between the two adjacent frame bodies of the bridge (S242). Specifically, the cutoff frequency may be determined like the cutoff frequency=1/(the interval between frame bodies/speed). Further, the cutoff frequency determining part 240 may record the data of the interval between the frame bodies in advance, and may set, as the cutoff frequency, the reciprocal of a time in which the vehicle has passed between the frame bodies at a predetermined speed. In this case, neither the vehicle passage sensor 220 nor the vehicle speed sensor 230 (steps S220 and S230) is required.

Note that both the bridge displacement calculating apparatus 100 and the bridge displacement measuring apparatus 200 of the present invention are mainly used for maintenance and inspection of bridges. For example, it is possible to diagnose deterioration of a bridge by driving a vehicle having a known weight on the bridge at a substantially constant speed and determining a displacement during a period of time when general vehicles hardly pass. Since the purpose of the present invention is to maintain and inspect a bridge in this way, it is unnecessary to consider a possibility that a sudden change in speed occurs or a plurality of vehicles pass at the same time in both the case of using the vehicle passage sensor 220 and the case of using the vehicle speed sensor 230. Further, if the traveling speed of a vehicle for inspection is determined in advance, the measurement can be performed with neither the vehicle passage sensor 220 nor the vehicle speed sensor 230.

The bridge displacement calculating apparatus 100 calculates the displacement of the bridge based on the acquired acceleration data and the determined cutoff frequency (S100, S105).

<Test>

Figure 7A:
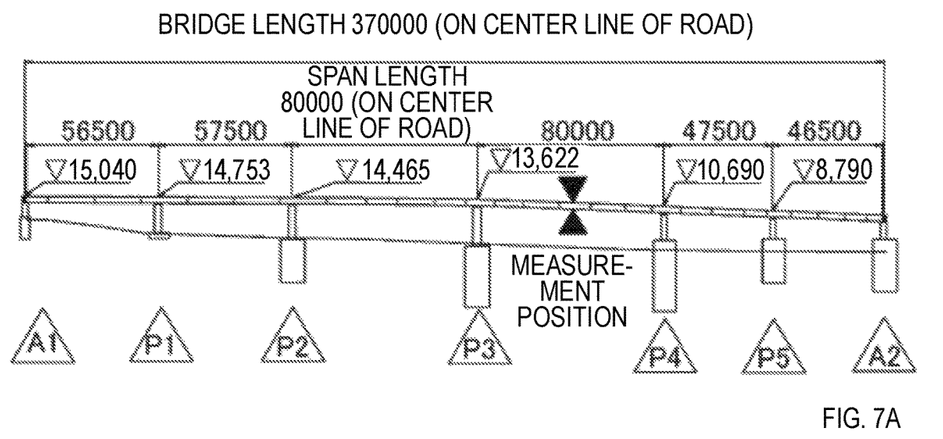
FIG. 7A is a side view of a bridge on which a test was conducted.
Figure 7B:
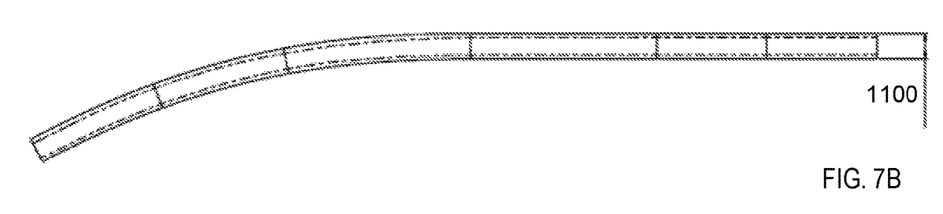
FIG. 7B is a plan view of the bridge on which the test was conducted.

FIG. 7A and FIG. 7B show a tested bridge. FIG. 7A is a side view of the bridge, and FIG. 7B is a plan view of the bridge. An acceleration sensor was installed at a substantially center portion between bridge piers P3 and P4 to measure an acceleration when the vehicle was passing. The interval between the bridge pier P3 and the bridge pier P4 is equal to 80,000 mm (80 m).

Figure 8A:
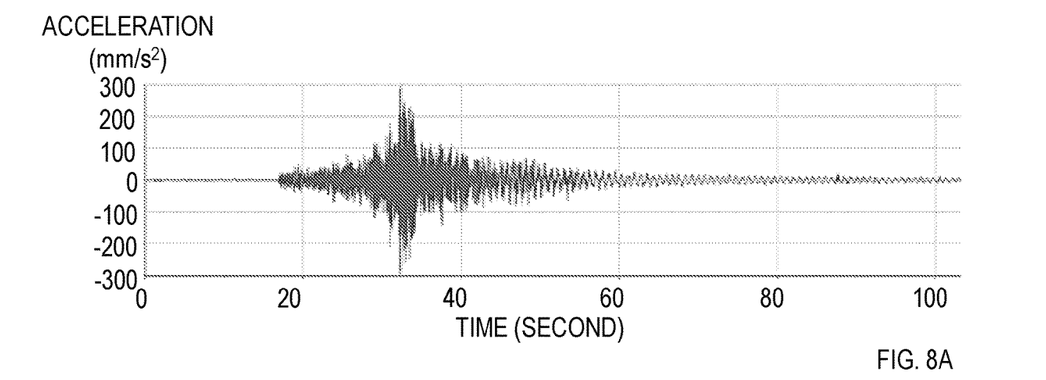
FIG. 8A is a diagram showing an example of DC-removed acceleration data in the processing flow of FIG. 3.
Figure 8B:
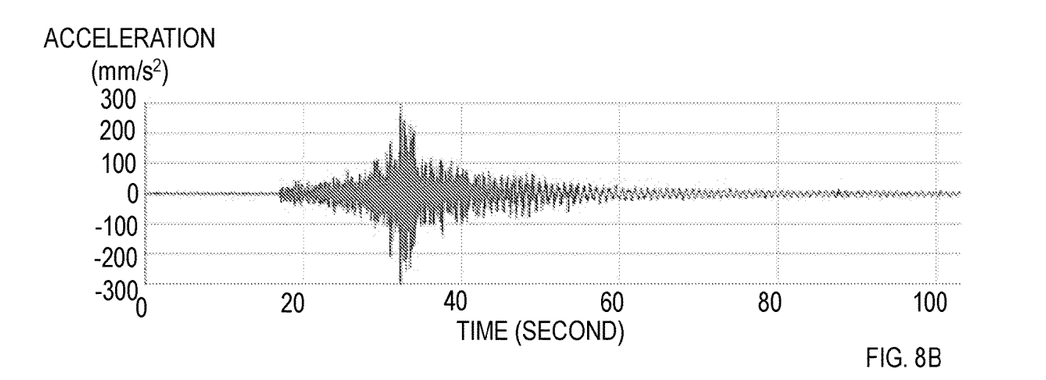
FIG. 8B is a diagram showing an output of a high-pass filter part when DC-removed acceleration data in the processing flow of FIG. 3 is input.
Figure 8C:
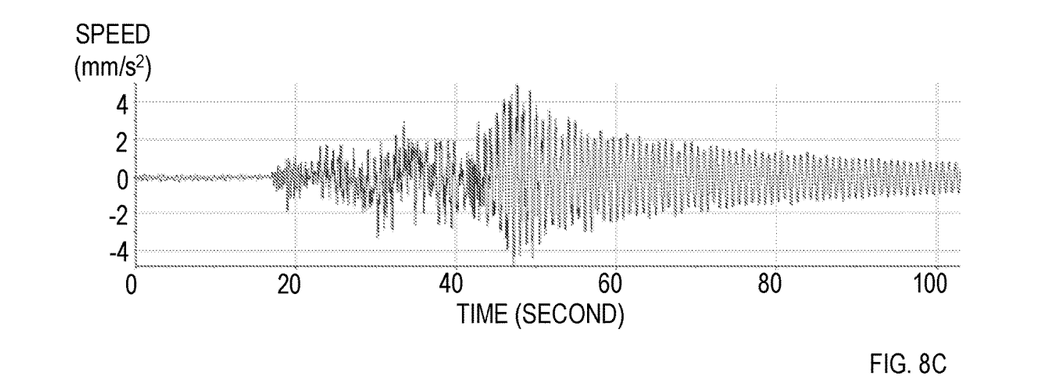
FIG. 8C is a diagram showing an output of a first integration part when the output of the high-pass filter part in the processing flow of FIG. 3 is used as an input.
Figure 9A:
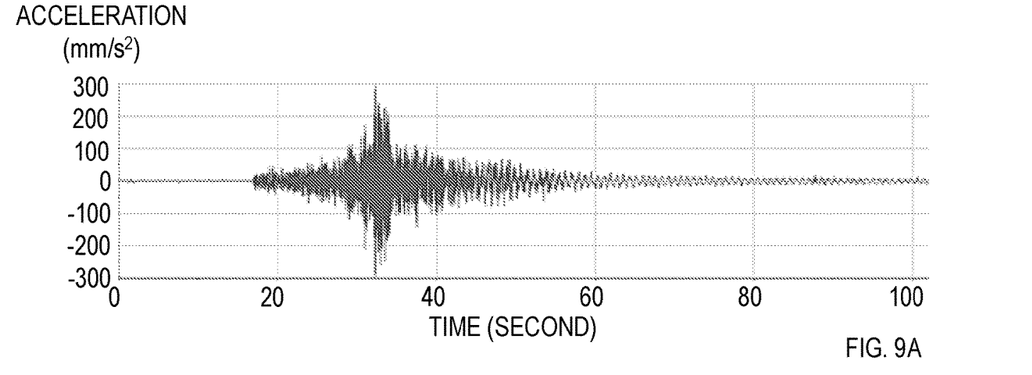
FIG. 9A is a diagram showing an example of DC-removed acceleration data in the processing flow of FIG. 4.
Figure 9B:
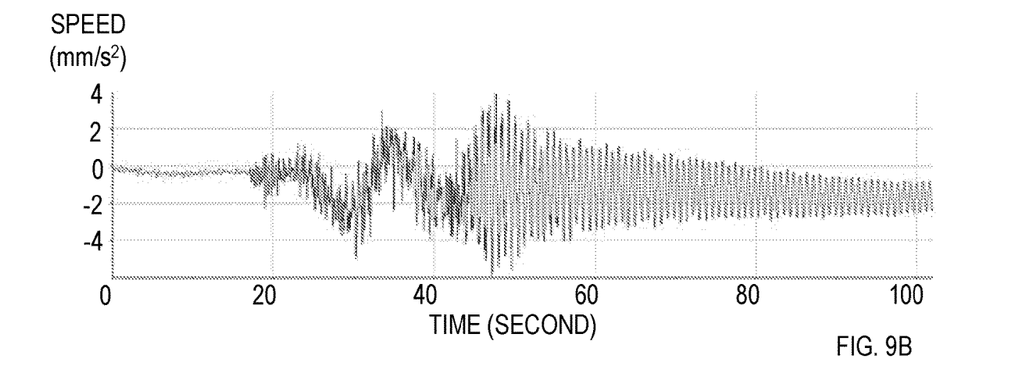
FIG. 9B is a diagram showing an output of the first integration part when the DC-removed acceleration data in the processing flow of FIG. 4 is used as an input.
Figure 9C:
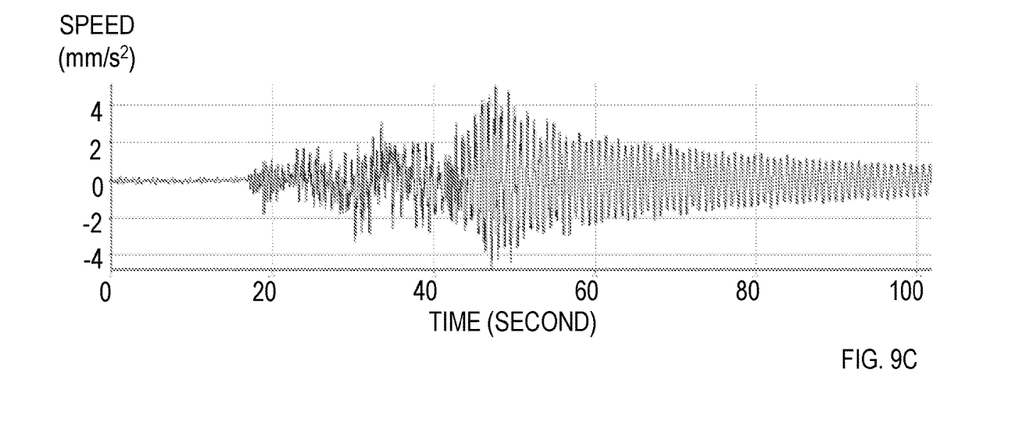
FIG. 9C is a diagram showing an output of the high-pass filter part when the output of the first integration part in the processing flow of FIG. 4 is used as an input.

FIGS. 8A, 8B, and 8C show an example of data in the processing flow of FIG. 3, and FIGS. 9A, 9B, 9C show an example of data in the processing flow of FIG. 4. The horizontal axis represents the time (second), and a vehicle has passed the bridge pier P3 around 27 seconds, and has passed the bridge pier P4 around 35 seconds. FIG. 8A and FIG. 9A show DC-removed acceleration data (data obtained by removing DC components from data acquired by the acceleration sensor 210). The vertical axis shows the acceleration (mm/s$^2$). FIG. 8A and FIG. 9A show the same data. FIG. 8B shows the output of the high-pass filter part 120 when the DC-removed acceleration data is input thereto. The vertical axis shows the acceleration (mm/s$^2$). FIG. 8C shows the output of the first integration part 130 when the output of the high-pass filter part 120 is input thereto. The vertical axis shows the speed (mm/s). FIG. 9B shows the output of the first integration part 130 when the DC-removed acceleration data is input thereto. The vertical axis shows the speed (mm/s). FIG. 9C shows the output of the high-pass filter part 120 when the output of the first integration part 130 is input thereto. The vertical axis shows the speed (mm/s). From FIGS. 8C and 9C, it can be seen that the results are almost the same even when the order of the high-pass filter and the integration is reversed. Note that it takes about 8 seconds to have passed between the frame bodies, so that the frequency components of about 0.12 Hz or less are reduced.

Figure 10A:
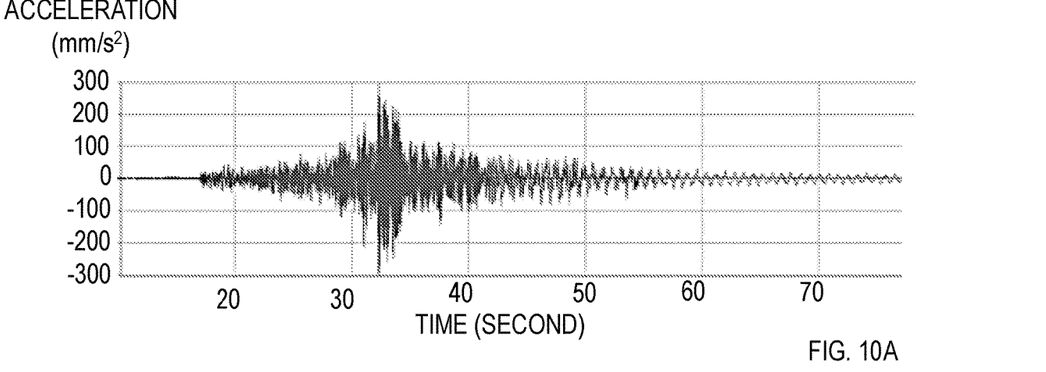
FIG. 10A is a diagram showing a result obtained by determining a displacement from an acceleration, and is a diagram showing DC-removed acceleration data.
Figure 10B:
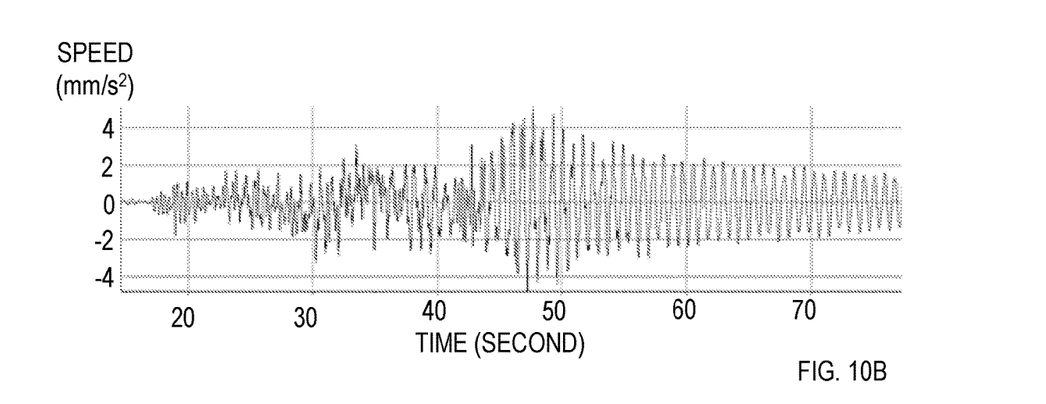
FIG. 10B is a diagram showing a result obtained by determining a displacement from an acceleration, and is a diagram showing data obtained by integrating acceleration data once and reducing a low frequency component by the high-pass filter.
Figure 10C:
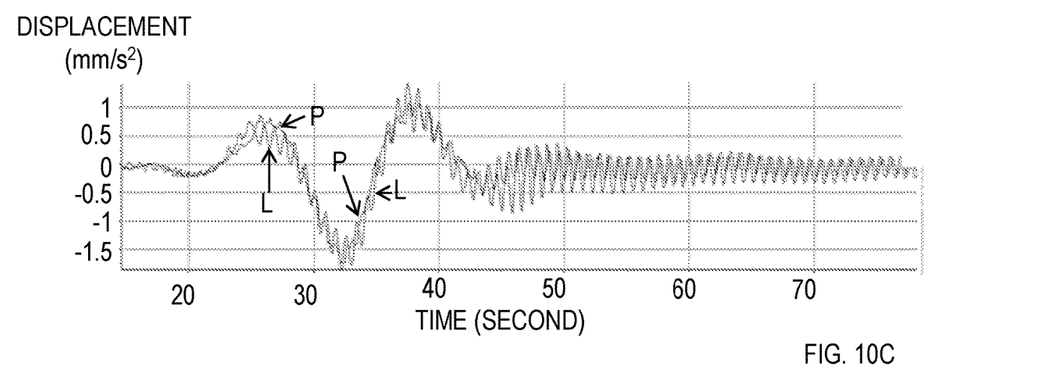
FIG. 10C is a diagram showing a result obtained by determining a displacement from an acceleration, and is a diagram showing data obtained by further integrating the data in FIG. 10B and data of a displacement measured by a laser Doppler displacement meter.

FIGS. 10A, 10B, and 10C are diagrams showing results obtained by determining the displacement from the acceleration. FIG. 10A is DC-removed acceleration data, which is the same as those of FIGS. 8A and 9A. FIG. 10B is the same as FIG. 9C, and shows data obtained by integrating the acceleration data once and reducing low frequency components by the high-pass filter. FIG. 10C shows data obtained by further integrating the data in FIG. 10B (a displacement which is the output of the second integration part 140) and data of a displacement measured by a laser Doppler displacement meter. "P" is appended to indicate the displacement which is the output of the second integration part 140, and "L" is appended to indicate the displacement measured by the laser Doppler displacement meter. Although there is some deviation, the displacement determined by the bridge displacement calculating apparatus 100 and the displacement measured by the laser Doppler displacement meter show similar displacements as a whole.

Figure 11:
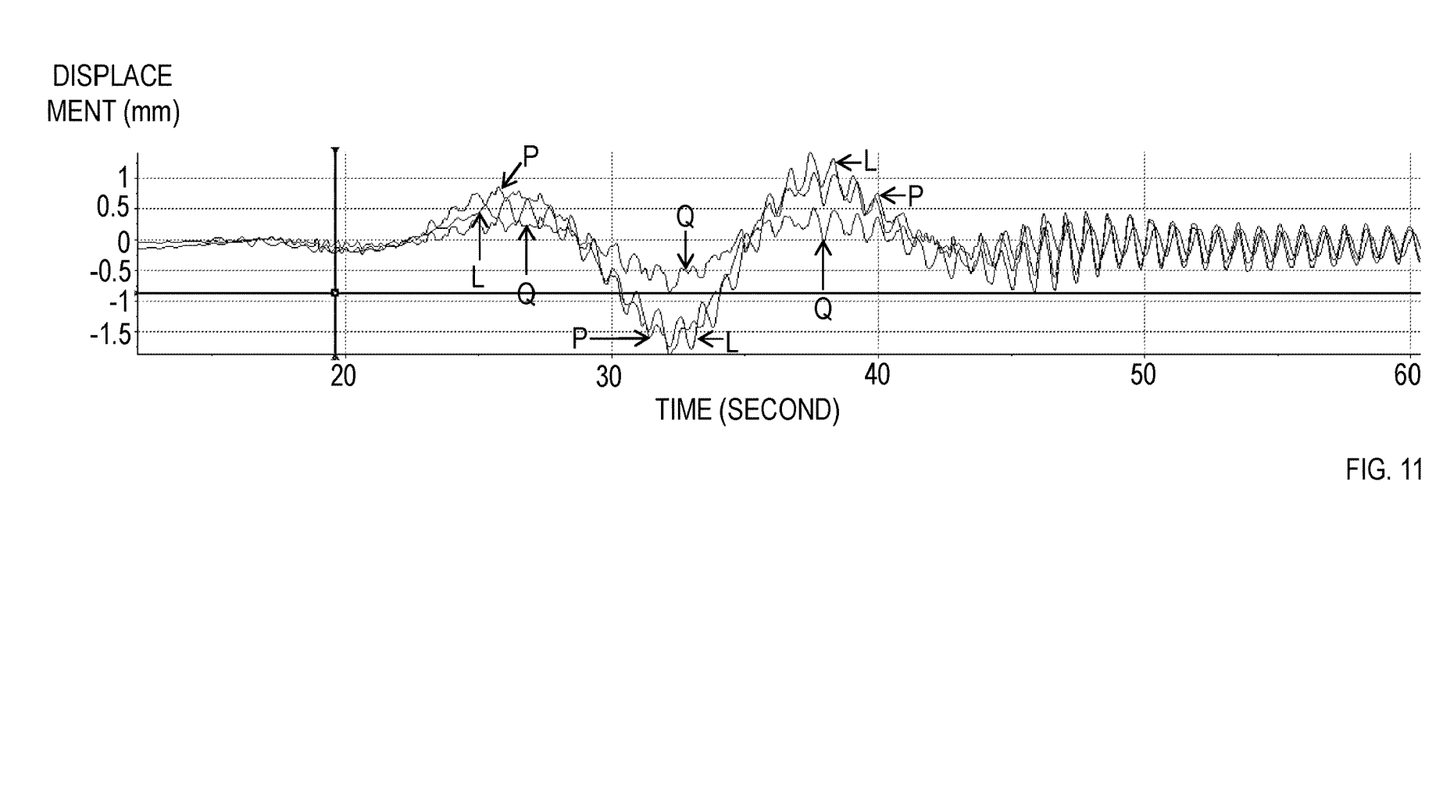
FIG. 11 is a diagram showing an example when a cutoff frequency is changed.

FIG. 11 is a diagram showing an example when the cutoff frequency is changed. In FIG. 11, a result of determining a displacement when the cutoff frequency of the high-pass filter is set to 0.2 Hz is added in FIG. 10C. The data of the displacement when the cutoff frequency is set to 0.2 Hz is indicated by "Q". It can be seen that if an excessively high frequency is set as the cutoff frequency, the calculation result of the displacement would be small.

Figure 12:
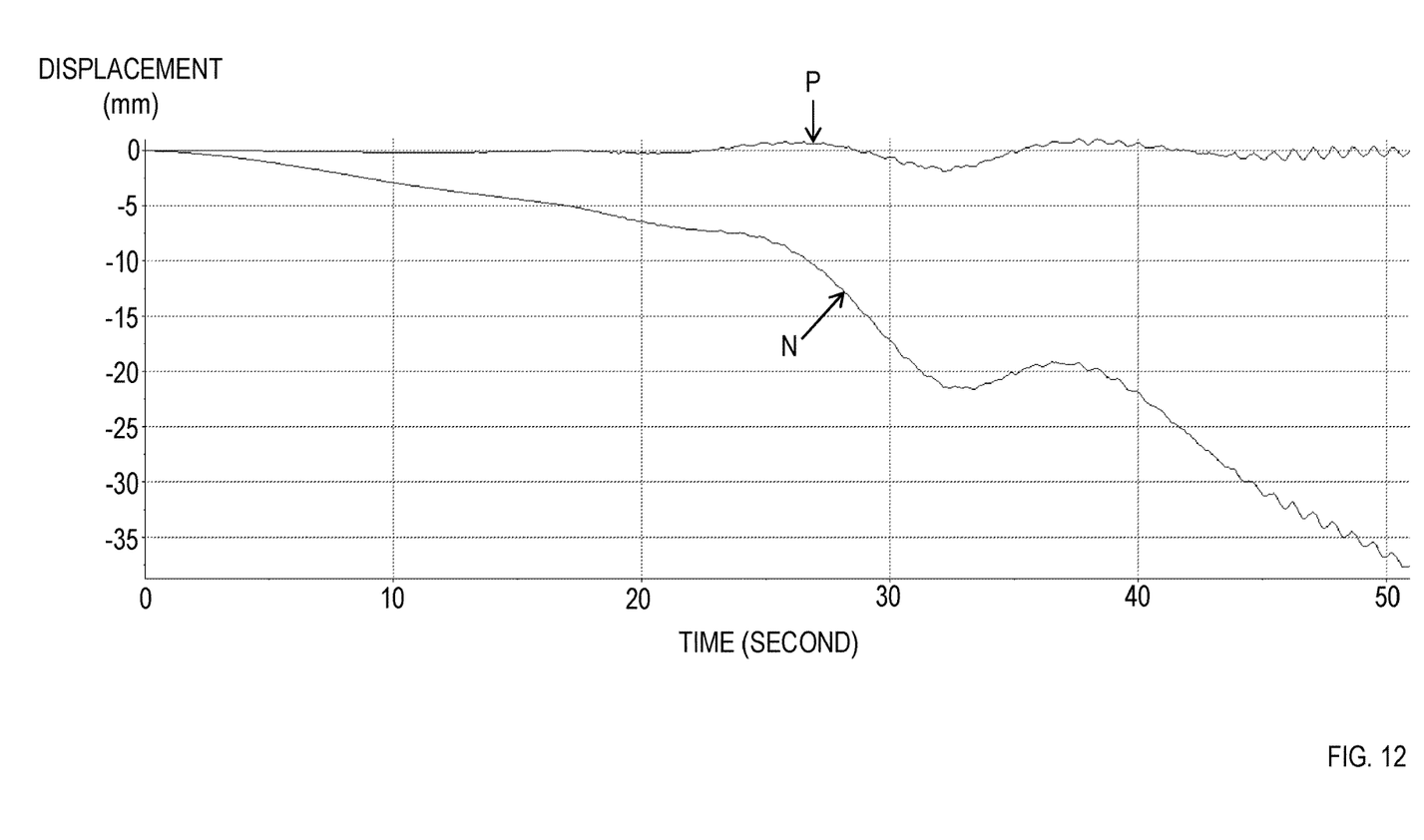
FIG. 12 is a diagram showing an example when a low frequency component is not reduced.

FIG. 12 is a diagram for showing an example in the case where the low frequency components are not reduced. The vertical axis of FIG. 12 has a different scale from that of the vertical axis of FIG. 10C and FIG. 11, but shows a displacement. Data to which "P" is appended in FIG. 12 is the same as data to which "P" is appended in FIG. 10C and FIG. 11. Data to which "N" is appended are data obtained by performing second-order integration on DC-removed acceleration data without using the high-pass filter part 120. It can be seen that if the high-pass filter part 120 is not used, errors are accumulated due to integration.

From these results, it can be seen that if the low frequency components of the acceleration data are not reduced, errors would be accumulated due to integration and if the low frequency components are reduced with an excessively high cutoff frequency, the calculation result of the displacement would be small. In other words, it can be seen that the frequency characteristics of the high-pass filter part 120 may be adjusted so as to reduce the low frequency components to the extent that errors do not accumulate and the calculated value of the displacement is not too small. In the present invention, as a guideline for designing the high-pass filter part 120, it is shown that the cutoff frequency may be set to the reciprocal of the time in which the vehicle has passed between the frame bodies of the bridge. More detailed frequency characteristics may be appropriately designed in consideration of the required measurement accuracy and the like.

The reason why the accumulation of errors caused by integration can be reduced by using a high-pass filter whose cutoff frequency is set to the reciprocal of the time in which the vehicle has passed between the frame bodies of the bridge is estimated as follows. The acceleration sensor is fixed to the bridge. Since the bridge deflects when the bridge is displaced, the direction of gravity changes slightly for the acceleration sensor between when the bridge is not displaced and when the bridge is displaced. It is considered that a subtle change in the direction of gravity when the bridge is displaced induces a measurement error, and the measurement error is accumulated due to integration. Since the deflection of the bridge is caused by the passage of the vehicle, there should be no components each having a period which is longer than the time in which the vehicle has passed between the frame bodies of the bridge (frequencies lower than the cutoff frequency). Therefore, the present invention uses a high-pass filter in which the reciprocal of the time in which the vehicle has passed between the frame bodies of the bridge is set to the cutoff frequency.

According to the bridge displacement calculating apparatus and the bridge displacement measuring apparatus of the present invention, the reciprocal of the time in which the vehicle has passed between the frame bodies of the bridge is set to the cutoff frequency to reduce the low frequency components of the input data, whereby the measurement error contained in the acceleration data can be reduced, so that the displacement of the bridge can be determined while avoiding the accumulation of errors caused by integration. In addition, it is not necessary to specify the analysis period, and it is not necessary to know the exact time at which the vehicle has passed over the frame body.

[Program, Recording Medium]

Figure 13:
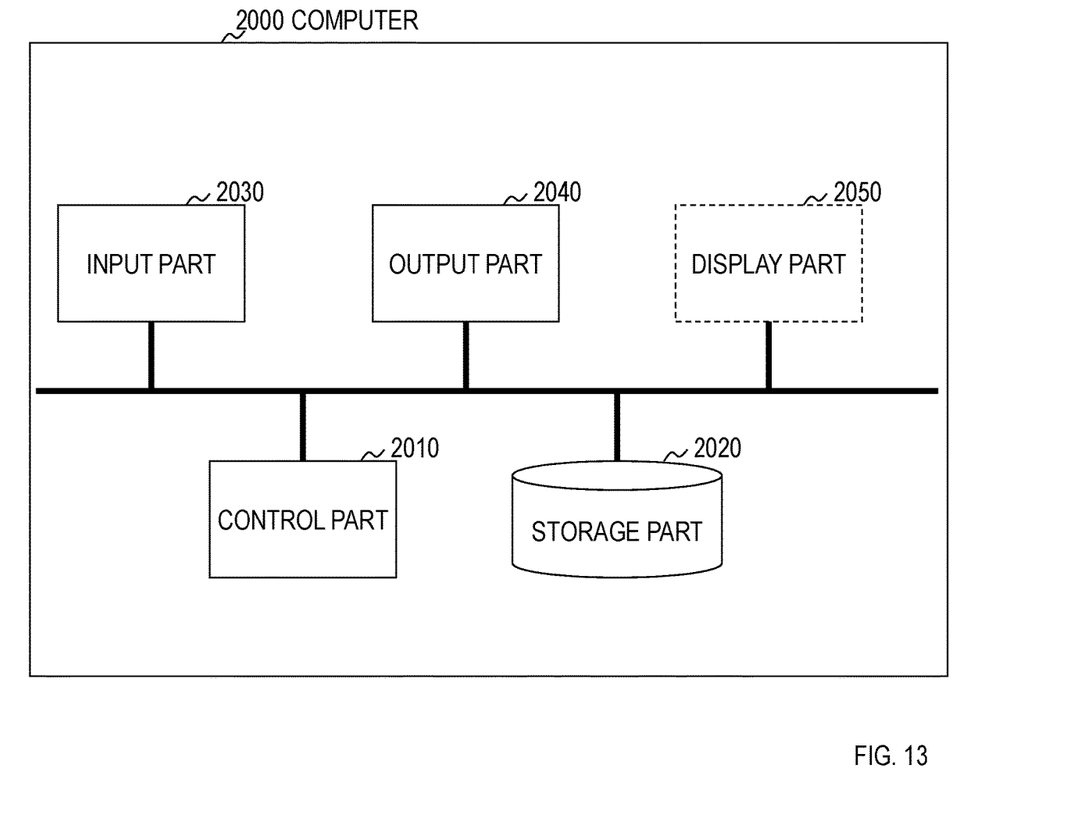
FIG. 13 is a diagram showing an example of a functional configuration of a computer.

The above-mentioned various processing can be executed by causing a recording part 2020 of a computer 2000 shown in FIG. 13 to read a program for executing each step of the above-mentioned method and causing a control part 2010, an input part 2030, an output part 2040, a display part 2050, and the like to operate.

The program that describes this processing content may be recorded in a computer-readable recording medium. Examples of the computer-readable recording medium include a magnetic recording apparatus, an optical disk, a magnetooptical recording medium, a semiconductor memory, and the like.

Further, the distribution of this program is performed, for example, by selling, transferring, renting, or the like a portable recording medium such as DVD or CD-ROM in which the program is recorded. Further, this program may be distributed by storing the program in a storage apparatus of a server computer, and transferring the program from a server computer to another computer via a network.

The computer for executing such a program first temporarily stores a program recorded in a portable recording medium or a program transferred from a server computer in its own storage apparatus, for example. Then, when the processing is executed, the computer reads out the program stored in its own recording medium and executes the processing according to the read-out program. Further, as another execution style of this program, the computer may read out the program directly from a portable recording medium and execute processing according to the program. Further, every time a program is transferred from the server computer to this computer, the computer may successively execute the processing according to the received program. Further, the above-mentioned processing may be executed by a so-called ASP (Application Service Provider) type service that implements a processing function only by an execution instruction and result acquisition without transferring any program from the server computer to this computer. The program in the present embodiment is assumed to include information which is used for processing by a computer and is equivalent to a program (data that is not a direct command to the computer, but has a property for defining the processing of the computer, etc.).

Further, in this style, the present apparatus is configured by executing predetermined programs on a computer, but at least some of these processing contents may be implemented in terms of hardware.

DESCRIPTION OF REFERENCE NUMERALS

100 Bridge displacement calculating apparatus
110 DC component removing part
120 High-pass filter part
130 First integration part
140 Second integration part
200 Bridge displacement measuring apparatus
210 Acceleration sensor
220 Vehicle passage sensor
230 Vehicle speed sensor
240 Cutoff frequency determining part

What is claimed is:

1. A bridge displacement calculating apparatus for calculating a displacement of a bridge induced when a vehicle passes, based on acceleration data at a predetermined location of the bridge, comprising:
    a DC component removing part for removing DC components of the acceleration data and outputting DC-removed acceleration data;
    a high-pass filter part for reducing low frequency components of input data thereto by using, as a cutoff frequency, a reciprocal of a time in which the vehicle has passed between frame bodies of the bridge;
    a first integration part for integrating input data thereto, and outputting the integrated input data; and
    a second integration part for integrating input data thereto and outputting displacement data, wherein
    the high-pass filter part receives the DC-removed acceleration data, the first integration part receives an output of the high-pass filter part, and the second integration part receives an output of the first integration part, or
    the first integration part receives the DC-removed acceleration data, the high-pass filter part receives the output of the first integration part, and the second integration part receives the output of the high-pass filter part.

2. A bridge displacement measuring apparatus comprising the bridge displacement calculating apparatus according to claim 1, further comprising:
    an acceleration sensor for acquiring acceleration data at the predetermined location of the bridge; and
    a cutoff frequency determining part for determining the cutoff frequency.

3. The bridge displacement measuring apparatus according to claim 2, further comprising
a vehicle passage sensor for detecting a vehicle passing each position of two adjacent frame bodies of the bridge, wherein
the cutoff frequency determining part determines the cutoff frequency based on an output of the vehicle passage sensor.

4. The bridge displacement measuring apparatus according to claim 2, further comprising
a vehicle speed sensor for measuring a speed of a vehicle passing the bridge, wherein
the cutoff frequency determining part determines the cutoff frequency based on an output of the vehicle speed sensor and an interval between two adjacent frame bodies of the bridge.

5. A bridge displacement calculating method for calculating a displacement of a bridge induced when a vehicle passes, based on acceleration data at a predetermined location of the bridge, comprising:
a DC component removing step of removing DC components of the acceleration data and outputting DC-removed acceleration data;
a high-pass filter step of reducing low frequency components of input data thereto by using, as a cutoff frequency, a reciprocal of a time in which the vehicle has passed through the bridge;
a first integration step of integrating input data thereto, and outputting the integrated input data; and
a second integration step of integrating input data thereto and outputting displacement data, wherein
the high-pass filter step receives the DC-removed acceleration data, the first integration step receives an output of the high-pass filter step, and the second integration step receives an output of the first integration step, or
the first integration step receives the DC-removed acceleration data, the high-pass filter step receives the output of the first integration step, and the second integration step receives the output of the high-pass filter step.

6. A bridge displacement measuring method executing:
an acceleration acquisition step of acquiring acceleration data at the predetermined location of the bridge;
a cutoff frequency determining step of determining the cutoff frequency; and
each step of the bridge displacement calculating method according to claim 5.

7. The bridge displacement measuring method according to claim 6, further comprising
a vehicle passage detection step for detecting a vehicle passing at each position of two adjacent frame bodies of the bridge, wherein
the cutoff frequency determining step determines the cutoff frequency based on an output of the vehicle passage detection step.

8. The bridge displacement measuring method according to claim 6, further comprising
a vehicle speed measuring step of measuring a speed of a vehicle passing through the bridge, wherein
the cutoff frequency determining step determines the cutoff frequency based on an output of the vehicle speed measuring step and an interval between two adjacent frame bodies of the bridge.

9. A non-transitory computer-readable recording medium having a program recorded thereon for causing a computer to execute each step of the bridge displacement calculating method according to claim 5.

10. A non-transitory computer-readable recording medium having a program recorded thereon for causing a computer to execute each step of the bridge displacement measuring method according to claim 6.

11. A non-transitory computer-readable recording medium having a program recorded thereon for causing a computer to execute each step of the bridge displacement measuring method according to claim 7.

12. A non-transitory computer-readable recording medium having a program recorded thereon for causing a computer to execute each step of the bridge displacement measuring method according to claim 8.

* * * * *